United States Patent Office 3,527,778
Patented Sept. 8, 1970

3,527,778
3,17 - BISOXYGENATED 11β METHYL - 19 - NOR-
PREGN - 4 - EN - 20 - ONES AND DERIVATIVES
THEREOF
John S. Baran, Morton Grove, and Ivar Laos, Skokie, Ill.,
assignors to G. D. Searle & Co., Chicago, Ill., a corporation of Delaware
No Drawing. Continuation-in-part of application Ser. No.
688,988, Dec. 8, 1967. This application Feb. 27, 1969,
Ser. No. 803,077
Int. Cl. C07c 169/34
U.S. Cl. 260—397.45       7 Claims

ABSTRACT OF THE DISCLOSURE 3,17-bisoxygenated 11β - methyl - 19 - norpregn-4-en-20-ones and derivatives thereof useful as pharmacological agents, e.g., progestational, estrogen-inhibitory and antifertility, are prepared by processes which utilize 3-oxygenated 11β-methylestra - 1,3,5(10) - trien - 17 - ones as starting materials.

---

This application is a continuation-in-part of our copending application Ser. No. 688,988, filed Dec. 8, 1967, now abondoned.

The present invention is concerned with novel chemical compounds characterized by an 11β-methyl group and, more particularly, with 3,17-bisoxygenated 11β-methyl-19-norpregn-4-en-20-ones and derivatives thereof represented by the following structural formula

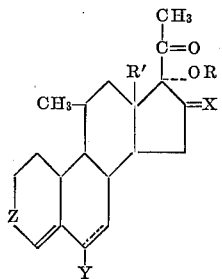

wherein R can be hydrogen or a lower alkanoyl radical, R' is a lower alkyl radical, X is $H_2$ or a methylene radical, Y is hydrogen or a methyl or chloro group, Z is a carbonyl, hydroxymethylene or (lower alkanoyl)oxymethylene radical and the dotted line indicates an optional 6(7) double bond.

The lower alkyl radicals encompassed by the foregoing structural representation are, typically, methyl, ethyl, propyl, butyl, pentyl, hexyl, heptyl and the branched-chain groups isomeric therewith.

Typical of the lower alkanoyl radicals represented in that formula are formyl, acetyl, propionyl, butyryl, valeryl, caproyl, heptanoyl and the branched-chain isomers thereof.

The novel compounds of the present invention are conveniently manufactured by processes which utilize, as starting materials, 11β-methyl derivatives of the following formula

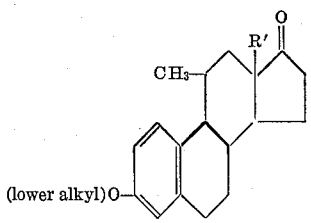

wherein R' is a lower alkyl radical. Thos starting materials together with methods for their manufacture are described in U.S. Pat. 3,299,108, issued Jan. 17, 1967. The initial step involves reaction with a triphenyl ethyl phosphonium halide and an alkaline reagent to afford the correponding 19-norpregna - 1,3,5(10),17(20)-tetraene. 3-methoxy-11β - methylestra - 1,3,5(10) - trien-17-one is thus allowed to react with triphenyl ethyl phosphonium iodide and potassium tertiary-butoxide in benzene containing dimethyl sulfoxide to afford 11β-methyl-19-norpregna - 1,3,5(10),17(20) - tetraen-3-ol 3-methyl ether. Hydroxylation of the 17(20) double bond of those materials, for example with osmium tetroxide, affords the corresponding 17α,20-diol. Reaction of the aforementioned 11β - methyl - 19 - norpregna-1,3,5(10),17(20)-tetraen-3-ol 3-methyl ether with osmium tetroxide in pyridine results in 11β-methyl - 19 - norpregna-1,3,5(10), triene-3,17α,20-triol 3-methyl ether. The aromatic A-ring is then reduced, typically by means of the Birch reduction, thus affording the corresponding $\Delta^{2,5(10)}$ enol ethers. A specific example is the reaction of 11β-methyl - 19 - norpregna-1,3,5(10) - triene - 3,17α-20 - triol 3-methyl ether with lithium and liquid ammonia to yield 11β-methyl - 19 - norpregna - 2,5(10)-diene-3,17α,20-triol 3-methyl ether. Hydrolysis of those enol ethers affords the corresponding $\Delta^4$-3-ketones. 11β-methyl - 19 - norpregna-2,5(10) - diene - 3,17α,20-triol 3-methyl ether is thus contacted with dilute hydrochloric acid in methanol to afford 17α,20 - dihydroxy - 11β - methyl-19-norpregn-4-en-3-one. Oxidation of the 20-hydroxy group of the latter intermediates results in the corresponding 20-keto substances. When 17α,20 - dihydroxy-11β-methyl-19-norpregn-4-en-3-one is allowed to react with aqueous chromic acid, preferably in the presence of manganese chloride, 17α-hydrovy - 11β - methyl-19-norpregn-4-ene-3,20-dione is produced. Acylation of the 17-hydroxy group is achieved by reaction with a lower alkanoic acid anhydride or halide in the presence of a strong acid catalyst, such as p-toluene-sulfonic acid, followed by hydrolysis, typically with hydrochloric acid and methanol, of any 3-enol acetate formed, or preferably by reaction with the acylating complex formed by reacting phosphorous pentachloride or antimony pentachloride with a lower alkanoic acid halide in a halogenated organic solvent such as chloroform, carbon tetrachloride, methylene chloride, trichlorethylene of 1,1,2-trichlorotrifluoroethane. 17β - hydroxy - 11β - methyl-19-norpregn-4-ene-3,20 - dione is thus contacted with the acylating complex formed from acetyl chloride and antimony pentachloride in 1,1,2-trichlorotrifluoroethane to afford 17α-acetoxy - 11β - methyl-19-norpregn-4-ene-3,20-dione.

The aforementioned 19-norpregna - 1,3,5(10),17(20)-tetraene intermediates are alternatively obtained by ethynylating a 17-keto starting material, reducing the 17-ethynyl to a 17-ethyl group and dehydrating the 17-ethyl-17-hydroxy product. 3-methoxy - 11β - methylestra-1,3,5 (10)-trien-17-one is thus allowed to react with the 30% lithium acetylide-70% ethylene diamine complex in tetrahydrofuran to produce 17α-ethynyl-11β-methylestra-1,3,5 (10)-triene-3,17β-diol 3-methyl ether; the latter product is reduced by catalytic hydrogenation using 5% palladium-on-carbon catalyst and the resulting 17α-ethyl-11β-methylestra-1,3,5(10)-diene-3,17β-diol 3-methyl ether is dehydrated with thionyl chloride in pyridine to yield 11β-methyl-19-norpregna-1,3,5(10)-17(20)-tetraen - 3 - ol 3-methyl ether.

An alternate route to the instant compounds involves oxidation of the 20-hydroxy group prior to Birch reduction, ketalization of the resulting 20-keto group, then Birch reduction followed by acylation of the 17-hydroxy substituent and acid hydrolysis to simultaneously remove the 20-ketal function and generate the 3-keto-$\Delta^4$ moiety.

That process is exemplified by the oxidation of 11β-methyl-19-norpregna-1,3,5(10)-triene - 3,17α,20 - triol 3-methyl ether with chromic acid and manganese chloride, reaction of the resulting 20-ketone with ethylene glycol in the presence of p-toluenesulfonic acid, Birch reduction of the 20-ethylene ketal thus produced, acetylation with the acetyl chloride-antimony pentachloride complex hereinbefore described and hydrolysis of the ketal and enol ether moieties with hydrochloric acid to yield the aforementioned 17α-acetoxy-14β-methyl-19-norpregna-4-ene-3,20-dione.

The compounds of this invention are manufactured also by utilizing 11β-methyl-20β-spirostan-3β-ol (described by Elks, J. Chem. Soc., 1960, 3333) as the starting material. Chromic acid oxidation of that material affords 11β-methyl-20β-spirostan-3-one, which is brominated to yield the 2,4,23-tribromo derivative. Dehydrobromination by heating with magnesium oxide in dimethylformamide results in 23 - bromo - 11β - methyl-20β-spinosta-1,4-dien-3-one, which is aromatized by heating with metallic lithium in tetrahydrofuran containing biphenyl to produce 11β-methyl-19-norspirosta-1,3,5(10)-trien-3-ol. Alkylation in acetone with methyl iodide in the presence of potassium carbonate affords the 3-methyl ether and the side-chain is removed by the successive steps of heating with acetic anhydride at about 200°, oxidation of the resulting pseudo-spirostan derivative with chromic acid and heating with acetic acid, thus affording 3-methoxy-19-norpregna-1,3,5 (10),16-tetraen-20-one. Peroxidation of the 16(17) double bond with alkaline hydrogen peroxide affords the corresponding 16α,17α-epoxide which is cleaved with hydrogen bromide to afford the 16β,17α-bromohydrin. Raney nickel hydrogenolysis of the latter substance affords 17α-hydroxy-3-methoxy-11β-methyl-19-norpregna - 1,3,5(10)-trien-20-one, which, as is described hereinbefore, is converted to 17α-acetoxy-11β-methyl-19-norpregn-4-ene-3,20-dione by the successive steps of ketalization of the 20-keto group, Birch reduction, acetylation of the 17-hydroxy group and acid hydrolysis of the 20-ketal and 3-enol ether functions.

The compounds of this invention are manufactured also by utilizing, as the starting material, 11-methylene-5α-androstane-3,17-diene, the manufacture of which is described by Kirk and Petrow, J. Chem. Soc., 1961, 2091. Reduction of that substance with a metallic reducing agent such as lithium tri-(tertiary-butoxy)aluminum hydride affords the corresponding 3β,17β-diol, which is catalytically hydrogenated with a platinum oxide catalyst to yield 11β-methyl-5α-androstane - 3β,17β-diol. Chromic acid oxidation of that material affords 11β-methyl-5α-androstane-3,17-dione, which is converted to the corresponding 2β,4α-dibromo derivative by reaction with bromine in methylene chloride containing acetic acid. Dehydrogenation of that material by heating with magnesium oxide in dimethylformamide affords 11β-methylandrosta-1,4-diene-3,17-dione, which is converted to the corresponding 17-ethylene ketal by heating with ethylene glycol, ethanol and p-toluenesulfonic acid. That ketal is aromatized with metallic lithium in tetrahydrofuran containing biphenyl to afford 3-hydroxy-11β - methylestra-1,3,5(10)-trien-17-one 17-ethylene ketal. Conversion of those compounds to the corresponding 3-(lower alkyl) ethers followed by acid cleavage of the 17-ketal function affords the corresponding 3-(lower alkoxy)-17-keto compounds. Alkylation with methyl iodide in methanol in the presence of potassium carbonate affords the 3-methyl ether and heating of that substance with dilute hydrochloric acid in methanol affords 3 - methoxy-11β-methylestra-1,3,5(10)-trien-17-one. The latter compound is alternatively obtained by reduction of the aforementioned 11β-methylandrosta-1,4-diene-3,17-dione to afford 17β-hydroxy-11β-methylandrosta-1,4-dien-3-one, aromatization of the latter diene by the method described above, alkylation with methyl iodide of the resulting 3-hydroxy compound and oxidation with chromic acid to regenerate the 17-keto group. As is described hereinbefore, that 17-ketone is converted to 17α-ethynyl-3-methoxy-11β-methylestra - 1,3,5(10) - trien-17β-ol and that 17-ethynyl compound is catalytically hydrogenated to afford 17α-ethyl-3-methoxy-11β-methylestra-1,3,5(10)-trien-17β-ol, which is converted by the processes described hereinbefore to the compounds of the present invention.

The instant 3-hydroxy compounds are conveniently manufactured by reduction of the coresponding 3-keto compounds. Metallic hydride reducing agent such as lithium aluminum hydride, lithium tri-(tertiary-butoxy) aluminum hydride and sodium borohydride are particularly suitable. 17-acetoxy-3-hydroxy-11β-methyl-19-norpregn-4-en-20-one is thus produced when 17α-acetoxy-11β-methyl-19-norpregn-4-ene-3,20-dione is contacted with lithium tri-(tertiary-butoxy)aluminum hydride in tetrahydrofuran at room temperature. Acylation of those 3-ols with a lower alkanoic acid anhydride in the presence of a suitable acid acceptor affords the corresponding 3-(lower alkanoate). 17α-acetoxy-3β-hydroxy-11β-methyl-19-norpregn-4-en-20-one is thus contacted with acetic anhydride and pyridine to yield 3,17α-diacetoxy-11β-methyl-19-norpregn-4-en-20-one, which is separated by fractional crystalization to afford the 3α and 3β epimers.

The 6-dehydro compounds of the present invention are conveniently obtained by oxidation of the corresponding 3,5-diene enol ethers, which are alternatively produced from the corresponding Δ⁴-3-ketones or the Δ²,⁵⁽¹⁰⁾ enol ethers. These alternate processes are exemplified by the isomerization and deketalization of 17α-hydroxy-3-methoxy - 11β - methyl-19-norpregna-2,5(10)-dien-20-one 20-ethylene ketal by means of p-toluenesulfonic acid to yield 17α - hydroxy - 3-methoxy-11β-methyl-19-norpregna-3,5-dien-20-one and the reaction of 17α-acetoxy-11β-methyl-19-norpregn-4-ene-3,20-dione with ethyl orthoformate and p-toluenesulfonic acid to yield 17α-acetoxy-3-ethoxy-11β-methyl-19-norpregna-3,5-dien-20-one. Oxidation of those enol ethers with manganese dioxide in benzene affords 17α - hydroxy - 11β-methyl-19-norpregna-4,6-diene-3,20-dione and 17α - acetoxy-11β-methyl-19-norpregna-4-6-diene-3,20-dione, respectively.

The aforementioned 3,5-diene enol ethers serve also as intermediates to the instant 6α-methyl and 6-methyl-6-dehydro compounds. 17α-hydroxy-3-methoxy-11β-methyl-19-norpregna-3,5-dien-20-one is thus subjected to the Vilsmeier process, i.e., reaction with dimethylformamide and prosgene in ethylene dichloride followed by reduction of the resulting iminium intermediate with sodium borohydride in pyridine, to afford the corresponding 6-dimethylaminomethyl derivative, which is quaternized with methyl iodine in benzene. That methiodide is heated with Raney nickel in methanol to afford 17α-hydroxy-3-methoxy-6,11β-dimethyl-19-norpregna-3,5-dien-20-one, which is hydrolyzed with hydrochloric acid in methanol, thus producing 17α - hydroxy-6α,11β-dimethyl-19-norpregn-4-ene-3,20-dione. When those 6-methyl-3,5-diene enol ethers are oxidized with manganese dioxide by the procedure hereinbefore described, the corresponding 6-methyl-Δ⁴,⁶ compounds are produced. 17α-hydroxy-3-methoxy-6,11β-dimethyl-19-norpregna-3,5-dien-20-one is thus contacted with manganese dioxide in benzene to yield 17α-hydroxy-6,11β-dimethyl-19-norpregna-4,6-diene-3,20-dione. Acylation of the 6-methyl-Δ⁴ and 6-methyl-Δ⁴,⁶ derivatives by the procedures described hereinbefore yields the corresponding 17-(lower alkanoate).

The aforementioned 16-dehydro compounds are useful also as intermediates in the manufacture of the instant 16-methylene derivatives. Reaction of those 16-dehydro compounds with diazomethane affords the corresponding 16,17-[3′,1′-(2′-pyrazolino)] derivatives, which are pyrolyzed by heating at high temperature to produce the corresponding 16-methyl-16-dehydro compounds. The latter substances are peroxidized with alkaline hydrogen peroxide and the resulting 16α,17α-epoxides are cleaved with a strong acid to afford the desired 16-methylene-17α-hydroxy substances. Those processes are illustrated by the reaction of 3 - methoxy-11β-methyl-19-norpregna- 1,3,5(10),16-tetraen-20-one with diazo-methane to afford 3 - methoxy-11β-methyl-16,17-[3',1'-(2'-pyrazolino)]-19-norpregna-1,3,5(10)-trien-20-one, heating of that substance at about 180° to yield 3-methoxy-11β,16-dimethyl-19-norpregna-1,3,5(10),16-tetraen-20-one, peroxidation with alkaline hydrogen peroxide to afford 16α,17α-epoxy-3 - methoxy - 11β,16β-dimethyl-19-norpregna-1,3,5(10)-trien-20-one and reaction of that epoxide with p-toluenesulfonic acid to afford 17α - hydroxy - 3-methoxy-16-methylene-19-norpregna-1,3,5(10)-trien-20-one. Birch reduction of that intermediate followed by hydrolysis of the resulting enol ether, chromic acid oxidation of the resulting 20-hydroxy group and acetylation of the 17-hydroxy group results in the instant 17α-acetoxy-11β-methyl-16-methylene-19-norpregn-4-ene-3,20-dione.

The instant 6α-chloro derivatives are produced by subjecting the aforementioned 3,5-diene enol ethers to the action of N-chlorosucinimide. 17α-hydroxy-3-methoxy-11β-methyl-19-norpregna-3,5-dien-20-one upon reaction with N-chlorosucinimide thus affords 6α-chloro-17α-hydroxy-11β-methyl-19-norpregn-4-ene-3,20-dione. Dehydrogenation of those 6α-chloro compounds yields the instant 6-chloro-6-dehydro derivatives. 6α-chloro-17α-hydroxy-11β-methyl-19-norpregn-4-ene-3,20-dione is thus contacted with 2,3-dichloro-5,6-dicyano-1,4-benzoquinone and p-toluenesulfonic acid to afford 6-chloro-17α-hydroxy-11β-methyl-19-norpregna-4,6-diene-3,20-dione. Acylation of 6α - chloro-17α-hydroxy-11β-methyl-19-norpregn-4-ene-3,20-dione or 6 - chloro-17α-hydroxy-11β-methyl - 19-norpregna-4,6-diene-3,20-dione with acetyl chloride by the aforementioned procedure yields 17α-acetoxy - 6α - chloro-11β-methyl-19-norpregn-4-ene-3,20-dione and 17α-acetoxy-6chloro-11β-methyl-19-norpregna-4,6-diene-3,20-dione, respectively.

A preferred method for manufacture of the instant 6-chloro-6-dehydro compounds utilizes the corresponding 6-dehydro substances as starting materials. As a specific example, 17α - acetoxy - 11β-methyl-19-norpregna-4,6-diene-3,20-dione in methylene chloride is epoxidized, typically with monoperphthalic or m-chloroperbenzoic acid, pregn-4-ene-3,20-dione. Cleavage of that epoxide by means of hydrogen chloride in dioxane results in 17α-acetoxy - 6β - chloro-7α-hydroxy-11β-methyl-19-norpregn-4-ene-3,20-dione. Formation of the 7-methanesulfonate is accomplished by reaction of that chlorohydrin with methanesulfonyl chloride in pyridine at 0° and that ester is heated in dimethylformamide with sodium acetate at about 80° to afford 17α-acetoxy-6-chloro-11β-methyl-19-norpregna-4,6-diene-3,20-dione.

The instant compounds wherein the 13β-alkyl group contains more than one carbon atom are obtained as dl-mixtures. Resolution of these dl-compounds to afford the individual d and l enantiomorphs is conveniently effected by esterification of an hydroxy group with a dibasic acid anhydride such as succinic or phthalic anhydride to afford the corresponding acid ester, which is resolved by means of an optically active amine such as brucine, morphine, quinine, quinidine, strychnine, etc.

The compounds of this invention are useful as the result of their valuable pharmacological properties. They are, for example, potent progestational, estrogen-inhibitory and anti-fertility agents.

The progestational property of the instant compounds is specifically illustrated by the activity of 17α-acetoxy-11β-methyl-19-morpregn-4-ene-3,20-dione when tested in a modification of the assay originally described by Clauberg, C. Zentr. Gynakol., 54, 2757 (1930) and later in Hormone Assay, C. W. Emmens, Academic Press, page 422 (1950). The modified assay is described as follows:

Female rats weighing about 1 kg. are primed daily for 6 days with 5 mcg. subcutaneous injections of estradiol (17β). Starting on the day following the last priming injection, the test compound, dissolved or suspended in corn oil, is administered subcutaneously each day for a period of 5 days. A control group of animals is treated with corn oil alone. One the day after the last treatment, the animals are sacrificed; a segment of the uterus is taken for histological examination and the degree of arborization of the endometrial glands is graded by the method described by McPhail, M. K., J. Physiol., 83, 145 (1934). The progestational responses are rated on a scale from 1 to 4, a response of at least 2 being required for a compound to be rated active.

The estrogen-inhibitory property of the compounds of this invention is specifically illustrated by the activity of 17α-acetoxy-11β-methyl - 19 - norpregn - 4 - ene - 3,20-dione in the assay described by Edgren and Calhoun, Proc. Soc. Exp. Biol. Med., 94, 537 (1957), the details of which assay are as follows:

Groups of 8–10 immature female mice are injected once daily for a period of 3 days with 0.1 ml. of a corn oil solution containing 0.1 mcg. of estrone together with ⅓ of the selected dose of the test compound. 24 hours after the final injection the animals are sacrificed and their uteri are removed, cleaned and weighed. The uterine weights are compared with those of a similar group of control animals receiving injections of corn oil containing the same dose of estrone alone. A compound is designated active if it produces a uterine response significantly smaller ($P \leq 0.01$) than control values. Potency is expressed in terms of percentage of the activity of the standard, i.e. progesterone.

The antifertility property of the compounds of this invention is illustrated by the activity of 17α-acetoxy-11β-methyl-19-norpregn-4-ene-3,20-dione and 3β17α - diacetoxy - 11β - methyl - 19 - norpregn4-en-20-one when assayed as follows:

Mature female rabbits (Dutch Belted Strain) weighing 1.7–2.8 kg. are injected intravenously with 1 mg. lutenizing hormone to induce ovulation, then are immediately inseminated artificially with 0.5 ml. of semen diluted with physiological saline to a concentration of $20 \times 10^6$ sperm per ml. The test compound, dissolved or suspended in corn oil, is administered subcutaneously daily for a period of 8 successive days, starting with the sixth day prior to insemination. Control animals are treated with corn oil alone. The animals are sacrificed 48 hours after insemination and the oviducts and uteri are then removed and flushed with physiological saline solution. The washings are collected and examined microscopically and the state of development and condition of the ova are noted. Fertilization is presumed to have occurred if cleavage of the ovum has taken place. A compound is considered active if the proportion of ova fertilized is significantly less than ($P \leq 0.05$) that observed in concurrently treated control animals. A dose of 0.5 mg. of progesterone per day significantly decreases the proportion of fertilized ova.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples, temperatures are given in degrees centigrade (° C.). Quantities of materials are expressed in parts by weight unless otherwise noted.

EXAMPLE 1

To a solution of 4.1 parts of 11-methylene-5α-androstane-3,17-dione in 80 parts of tetrahydrofuran, in a nitrogen atmosphere, is added, at 0–5° with stirring a cold solution of 40 parts of lithium tri-(tertiary-butoxy) aluminum hydride in 150 parts of tetrahydrofuran. The resulting reaction mixture is stirred for about 3 hours, then is poured carefully into excess dilute acetic acid. The resulting acidic mixture is extracted with ether and the organic layer is separated, then washed with water until neutral. Drying of that washed solution over anhydrous sodium sulfate followed by distillation of the solvent under reduced pressure affords 11-methylen-5α-androstane-3β,17β-diol.

EXAMPLE 2

A mixture containing 20.2 parts of 11-methylen-5α-androstane-3β,17β-diol, 4 parts of platinum oxide catalyst and 250 parts by volume of a 11:1 mixture of glacial acetic acid and ethyl acetate is shaken with hydrogen at atmospheric pressure and room temperature until one molecular equivalent of hydrogen is absorbed. The catalyst is removed by filtration and the filtrate is distilled to dryness under reduced pressure. The resulting residue is dissolved in approximately 80 parts of methanol and a solution of 10 parts of potassium hydroxide in 40 parts of water containing 32 parts of methanol is added. That mixture is heated at steam bath temperature for about 30 minutes in an atmosphere of nitrogen, at the end of which time it is cooled and water is added. Concentration of the solution by distillation under reduced pressure results in removal of methanol and crystallization of the product. That material is collected by filtration, washed successively with water, dilute acetic acid and water, then dried to afford 11β-methyl-5α-androstane-3β,17β-diol, which exhibits infrared absorption maxima, in chloroform, at about 2.73 and 2.87 microns and nuclear magnetic resonance peaks at about 49, 54, 61, 69, 75 and 200–225 cycles per second.

EXAMPLE 3

To a solution of 21 parts of 11β-methyl-5α-androstane-3β,17β-diol in 800 parts of acetone is added, with stirring over a period of about 30 minutes at 10- 15°, 35 parts by volume of an aqueous solution, 8 N in chromium trioxide and 8 N in sulfuric acid. Towards the end of that addition, 10 parts of magnesium sulfate is added in order to keep the precipitated salts granular. 16 parts of isopropyl alcohol is then added in order to destroy the excess reagent and the mixture is filtered, then diluted with approximately 100 parts of volume of saturated aqueous sodium bicarbonate. Distillation of the mixture under reduced pressure results in removal of the acetone and the aqueous residue is cooled and extracted with benzene. The benzene extract is dried over anhydrous magnesium sulfate, then distilled to dryness. The residue thus obtained is crystallized from ether-hexane to yield pure 11β-methyl-5α-androstane-3,17-dione, melting at about 136–138°.

EXAMPLE 4

To a solution of 1.6 parts of 11β-methyl-5α-androstane-3,17-dione in 6.7 parts of methylene chloride containing 10 parts of glacial acetic acid and 0.05 part of a 30% hydrobromic acid in acetic acid solution is added, with stirring over a period of about 30 minutes, a solution of 1.95 parts of bromine in 30 parts of methylene chloride. After stirring for about 30 minutes, the solution is concentrated under reduced pressure to remove the solvent, thus effecting crystallization of the crude product. That material is triturated with water, then collected by filtration, washed with water and dried in air to afford 2β,4α-dibromo-11β-methyl-5α-androstane-3,17-dione, which exhibits infrared absorption maxima at about 5.68 and 5.72 microns and nuclear magnetic resonance peaks at about 58, 67, 75, 77.5, 275 and 320 cycles per second.

EXAMPLE 5

To a mixture of 0.6 part of magnesium oxide with 9.5 parts of dimethylformamide is added, with stirring at the reflux temperature, 2.1 parts of 2β,4α - dibromo - 11β-methyl-5α-androstane-3,17-dione and that reaction mixture is heated at the reflux temperature for about 30 minutes, then is cooled and poured, with stirring, into a mixture containing 18 parts of concentrated hydrochloric acid, 35 parts of water and 100 parts of ice. The crystalline precipitate which forms is collected by filtration, washed with water and dried in air to afford the crude product. Recrystallization from acetone-hexane affords crystals of 11β-methylandrosta-1,4-diene-3,17-dione, melting at about 180°. This compound exhibits an ultraviolet absorption maximum at about 242 millimicrons with a molecular extinction coefficient of about 14,800. Infrared absorption peaks are observed at about 5.76, 6.02, 6.17 and 6.23 microns and nuclear magnetic resonance peaks at about 62, 77, 83 and 84 cycles per second.

EXAMPLE 6

A mixture containing 4 parts of 11β-methylandrosta-1,4-diene-3,17-dione, 10 parts of lithium tri- (tertiary-butoxy) aluminum hydride and 180 parts of tetrahydrofuran is stirred at room temperature for about 20 minutes, then is diluted with approximately 100 parts by volume of 20% aqueous acetic acid and concentrated by distillation under reduced pressure. The residual mixture is extracted with a 1:1 benzene-ethyl acetate solution and that extract is washed successively with water and dilute aqueous sodium bicarbonate, then dried over anhydrous magnesium sulfate and distilled to dryness under reduced pressure. Crystallization of the resulting residue from ether affords the crude product, melting at about 168°. Further purification by recrystallization from acetone-hexane yields pure 17β-hydroxy-11β-methylandrosta-1,4-dien-3-one, melting at about 162–164°. This compound displays an ultraviolet absorption maximum at about 244 millimicrons with a molecular extinction coefficient of about 14,800. Infrared absorption peaks are observed at about 2.74, 2.90, 6.01 and 6.16 microns and nuclear magnetic maxima at about 55, 76.5, 82, 84 and 215 cycles per second.

EXAMPLE 7

A mixture containing 23 parts of 11β-methylandrosta-1,4-diene-3,17-dione, 17 parts of ethylene glycol, 2 parts of p-toluenesulfonic acid monohydrate and 1800 parts of benzene is heated at the reflux temperature with stirring for about 2 hours, during which time the water of reaction is continuously removed. The reaction mixture is then cooled, washed successively with aqueous sodium carbonate and water, dried over anhydrous magnesium sulfate and stripped of solvent by distillation under reduced pressure to afford 11β-methylandrosta-1,4-diene-3-17-dione 17-ethylene ketal.

EXAMPLE 8

To a mixture of approximately 42 parts of a 30% dispersion of lithium in paraffin, 125 parts of biphenyl, approximately 69 parts of diphenylmethane and 1,080 parts of tetrahydrofuran is added, with vigorous stirring at the reflux temperature over a period of 30 minutes, a hot solution of 100 parts of 11β-methylandrosta-1,4-diene-3,17-dione 17-ethylene ketal in 750 parts of tetrahydrofuran. Heating at the reflux temperature is continued for about 10 minutes, at the end of which time 28 parts of methanol and 80 parts of water are successively added. An additional 400 parts of water is then added and the solvent is removed by distillation under reduced pressure. The resulting aqueous solution is extracted with benzene and the extract is washed with dilute aqueous potassium hydroxide. These alkaline washings are combined with the aqueous phase and the resulting solution is washed with hexane, then added slowly with vigorous stirring to a mixture of 200 parts of acetic acid, 200 parts of water and 200 parts of ice, during which time the temperature is maintained below 10°. The resulting solid precipitate is isolated by filtration, then washed with water and dried to afford 3 - hydroxy-11β-methylestra-1,3,5(10)-trien-17-one 17-ethylene ketal.

EXAMPLE 9

A mixture containing 4 parts of 3-hydroxy-11β-methyl-estra-1,3,5(10)-trien-17-one 17-ethylene ketal, 22.8 parts of methyl iodide, 10 parts of potassium carbonate and 80 parts of methanol is heated at the reflux temperature with stirring for about 30 minutes. An additional 34.2 parts of methyl iodide is added during the ensuing 3 hour reflux period. The mixture is then diluted with water and concentrated under reduced pressure, thus effecting crystallization of the crude product, which is collected by filtration and dried to yield 3-methoxy-11β-methyl-estra-1,3,5(10)-trien-17-one 17-ethylene ketal.

EXAMPLE 10

To a solution of 1.3 parts of 3-methoxy-11β-methyl-estra-1,3,5(10)-trien-17-one 17-ethylene ketal in 25 parts of methanol is added 1.5 parts by volume of 4 N hydrochloric acid and the resulting reaction mixture is heated at steam bath temperature for about 1 hour, then is concentrated to dryness under reduced pressure. The resulting residue is extracted into chloroform and the chloroform layer is washed with saturated aqueous sodium bicarbonate, and dried over anhydrous magnesium sulfate and distilled to dryness under reduced pressure to afford 3-methoxy-11β-methylestra-1,3,5(10) - trien-17-one, melting at about 150°.

EXAMPLE 11

To a mixture of 5.7 parts of thionyl chloride with 50 parts of pyridine, cooled to between —10 and —20°, there is added, over a period of about 20 minutes, a solution of 9.6 parts of 17α-ethyl-11β-methylestra-1,3,5(10)-triene-3,17β-diol in 80 parts of pyridine. The resulting reaction mixture is allowed to warm to room temperature over a period of about 30 minutes, then is stirred at that temperature for about 90 minutes and finally cooled to 0.5°. The excess reagent is destroyed by the addition of approximately 2.4 parts of anhydrous ethanol and the mixture is extracted with chloroform. The organic layer is separated, washed successively with water and aqueous sodium bicarbonate, then dried over anhydrous sodium sulfate. The chloroform is removed by distillation under reduced pressure and traces of moisture are removed by azeotropic distillation with toluene. The crude product so produced is purified by chromatography on a silica gel column, using benzene-ethyl acetate mixtures as the developing and eluting solvents. Removal of the eluant by distillation under reduced pressure affords crystalline 11β-methyl-19-norpregna-1,3,5(10),17(20) - tetraen - 3 - ol 3-methyl ether, which exhibits nuclear magnetic resonance peaks at about 53, 57, 89, 96, 127 and 295–320 cycles per second.

EXAMPLE 12

A mixture containing 6.82 parts of 11β-methyl-19-nor-pregna-1,3,5(10),17(20)-tetraen-3-ol 3-methyl ether, 5.78 parts of osmium tetroxide and 87 parts of pyridine is stirred at room temperature for about 4 hours, at the end of which time a solution of 10.4 parts of sodium bisulfite in 174 parts of water and 116 parts of pyridine are added. That mixture is stirred for about 20 minutes, then is extracted with chloroform. The chloroform extract is washed with water, dried over anhydrous sodium sulfate, then stripped of solvent by distillation under reduced pressure. The crude product thus obtained is purified by chromatography on silica gel followed bp elution with 10–15% ethyl acetate in benzene solutions, thus producing crystalline 11β-methyl-19-norpregna-1,3,5(10)-triene-3,17α,20-triol 3-methyl ether, which exhibits nuclear magnetic resonance peaks at about 50, 58, 68, 75, 127 and 235–255 cycles per second.

EXAMPLE 13

To 88 parts of liquid ammonia is added dropwise, over a period of about 10 minutes, a solution of 2.3 parts of 11β - methyl - 19 - norpregna-1,3,5(10)-triene-3,17α,20-triol 3-methyl ether dissolved in 112 parts of tetrahydrofuran containing 16 parts of isopropyl alcohol. After the addition is complete, metallic lithium is added portionwise while the reaction mixture is vigorously stirred. Stirring is continued for approximately 1 hour following completion of the addition and 6.4 parts of ethanol is then carefully added dropwise over a period of about 20 minutes. Removal of the solvents by evaporation under a nitrogen atmosphere affords a slurry, which is diluted with ether, then washed with water. Drying of that ether solution over anhydrous sodium sulfate followed by distillation of the solution to dryness and azeotropic distillation with benzene affords 11β-methyl-19-norpregna-2,5(10)-diene-3,17α,20-triol 3-methyl ether, which, after recrystallization from ether, melts at about 149–151°.

EXAMPLE 14

A mixture containing 2.37 parts of 11β-methyl-19-norpregna - 2,5(10)-diene - 3,17α-20-triol 3-methyl ether, 80 parts of methanol and 10 parts by volume of 2 N hydrochloric acid is heated at the reflux temperature for about 30 minutes, then is cooled to 0–5° and a solution of 2 parts of potassium carbonate in approximately 10 parts of water is added. The methanol is distilled under reduced pressure and the resulting residue is extracted into ethyl acetate. The organic solution resulting is washed with water, dried over anhydrous sodium sulfate, then distilled to dryness under reduced pressure to afford solid 17α,20 - dihydroxy - 11β-methyl-19-norpregn-4-en-3-one, which exhibits an ultraviolet absorption maximum at about 241.5 millimicrons with a molecular extinction coefficient of about 13,900. Nuclear magnetic resonance peaks are observed at about 55.5, 61, 66.5, 68, 73, 233–252 and 350 cycles per second.

EXAMPLE 15

To a mixture containing 7 parts by volume of an aqueous solution, 8 N in chromium trioxide and 8 N in sulfuric acid, 0.9 part of manganese dichloride tetrahydrate and 13.5 parts of dimethylformamide, cooled to 0–5°, is added with stirring a solution of 1.33 parts of 17α,20 - dihydroxy - 11β-methyl-19-norpregn-4-en-3-one in 31.5 parts of dimethylformamide. The mixture is then allowed to warm to room temperature and is stirred at the latter temperature for about 3 hours. At the end of that time it is carefully poured with stirring into ice water and the precipitate which forms is collected by filtration, washed on the filter with water and dried in air to afford 17α - hydroxy - 11β-methyl-19-norpregn-4-ene-3,20-dione, which exhibits nuclear magnetic resonance peaks at about 50, 60, 68, 136.5 and 352 cycles per second.

EXAMPLE 16

To 7 parts of 1,1,2-trichlorotrifluoroethane is added, with stirring, 1.76 parts of antimony pentachloride and that mixture is cooled to 0–5°, at which time 0.5 part of acetyl chloride is added dropwise. Stirring is continued at that temperature for about 15 minutes, at the end of which time 8 parts of nitromethane is added. To the resulting two-phase system is then added 0.68 part of 17α-hydroxy - 11β - methyl-19-norpregn-4-en-3,20-dione and that reaction mixture is stirred for 15 minutes at 0–5°, then for 45 minutes at room temperature. The solution is again cooled to 0–5° and a solution of 3 parts of sodium acetate in 8 parts of water is added. Stirring at room temperature is continued for about 30 minutes, at the end of which time the mixture is extracted with chloroform. The chloroform layer is separated, washed successively with dilute aqueous sodium bicarbonate and water, then dried over anhydrous sodium sulfate. Distillation of that solution under reduced pressure affords the crude product, which is purified by chromatography on silica gel followed by elution with 10% ethyl acetate in benzene. Evaporation of the eluate to dryness affords a solid, which is further purified by recrystallization from ether, thus producing crystalline 17α - acetoxy - 11β-methyl-19- norpregn-4-en-3,20-dione, melting at about 190–191.5°. It is represented by the following structural formula

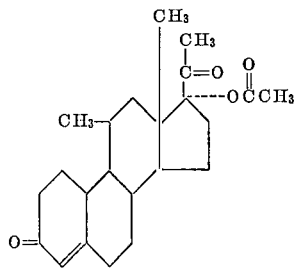

EXAMPLE 17

When an equivalent quantity of n-butyryl chloride is substituted in the procedure of Example 16, there is produced 17α-n-butyryloxy-11β-methyl-19-norpregn-4-ene-3,20-dione.

EXAMPLE 18

A mixture containing 13.1 parts of triphenyl phosphine, 18 parts of ethyl iodide and 39.6 parts of benzene is heated at the reflux temperature for about 16 hours, then is stirred while allowed to cool. That mixture is finally cooled to room temperature and the crystalline product is collected by filtration, washed on the filter with benzene and dried to afford ethyl triphenyl phosphonium iodide, melting at about 161.5–163°.

To 5.01 parts of ethyl triphenyl phosphonium iodide is added slowly over a period of about 5 minutes a solution of 1.34 parts of potassium tertiary-butoxide in 15 parts by volume of dimethyl sulfoxide. The resulting orange-red solution is stirred at room temperature for about 15 minutes, at the end of which time a solution of 1.19 parts of 3-methoxy-11β-methylestra-1,3,5(10)-trien-17-one in 17.6 parts of benzene is added over a period of about 10 minutes. The resulting solution is heated with occasional stirring at 60–65° for about 4 hours, then is allowed to stand at room temperature under nitrogen for about 16 hours. The mixture is cooled to 0–5°, then is partitioned between 10% aqueous sodium chloride and hexane. The hexane layer is separated, washed with water, dried over anhydrous sodium sulfate, then poured through a column of neutral alumina. The column is eluted with hexane and the eluates are combined and evaporated to dryness under reduced pressure. The crude product, obtained as a colorless oil, is purified by recrystallization from ether-methanol to afford 11β-methyl-19-norpregna-1,3,5(10),17(20)-tetraen-3-ol 3-methyl ether, melting at about 76.5–77.5°.

To a solution of 1.13 parts of 11β-methyl-19-norpregna-1,3,5(10),17(20)-tetraen-3-ol 3-methyl ether (prepared as described in the preceding paragraph) in 15 parts of pyridine is added with stirring 0.96 part of osmium tetroxide. The resulting reaction mixture is stirred at room temperature for about 16 hours, at the end of which time a solution of 1.73 parts of sodium bisulfite in 28.8 parts of water and 19.2 parts of pyridine is added. The resulting mixture is stirred for about 20 minutes, then is extracted with chloroform. The chloroform extract is washed several times with water, then is dried over anhydrous sodium sulfate and concentrated to a small volume under reduced pressure. The residual pyridine is removed by azeotropic distillation with toluene. Removal of the toluene by distillation under reduced pressure affords the crude product. Purification of that material is effected by crystallization from ether, thus affording 11β-methyl-19-norpregna-1,3,5(10)-triene-3,17α,20-triol 3-methyl ether.

EXAMPLE 19

To a solution of 2.3 parts of 17α-acetoxy-11β-methyl-19-norpregn-4-ene-3,20-dione in 22 parts of dioxane is added 0.18 part of ethanol, 2.12 parts of ethyl orthoformate and a solution of 0.11 part of p-toluenesulfonic acid monohydrate in 1.8 parts of dioxane. The resulting reaction mixture is stirred at room temperature for about 1¼ hours, then is neutralized by the addition of 1.8 parts of pyridine. The mixture is then concentrated under reduced pressure until crystallization of the product commences. Benzene is added and the resulting solution is washed several times with water, then dried over anhydrous sodium sulfate and concentrated to dryness under reduced pressure. The resulting crude product is azeotropically distilled with xylene to remove traces of ethyl orthoformate, thus affording crystalline 17α-acetoxy-3-ethoxy-11β-methyl-19-norpregna-3,5-dien-20-one, characterized by nuclear magnetic resonance peaks at about 44, 58, 64, 71, 78, 85, 122, 125, 217, 224, 231, 238 and 316 cycles per second.

To a solution of 2.4 parts of 17α-acetoxy-3-ethoxy-11β-methyl-19-norpregna-3,5-dien-20-one in 140 parts of benzene is added 12 parts of manganese dioxide and the resulting reaction mixture is stirred at room temperature for about 45 minutes. The oxidant is then removed by filtration and the filtrate is concentrated to dryness under reduced pressure. The resulting crude product is purified by adsorption on a silica gel chromatographic column followed by elution with 7% ethyl acetate in benzene and purification of the eluted fraction by recrystallization from acetone-hexane, thus affording 17α-acetoxy-11β-methyl-19-norpregna-4,6-dien-3,20-dione, melting at about 206–208°. It is characterized further by an ultraviolet absorption maximum at about 282.5 millimicrons with a molecular extinction coefficient of about 25,300.

EXAMPLE 20

To a cooled solution of 0.45 part of 17α-acetoxy-11β-methyl-19-norpregn-4-ene-3,20-dione in 4.5 parts of tetrahydrofuran is added 0.9 part of lithium tri-(tertiary-butoxy) aluminum hydride and the resulting reaction mixture is stirred at room temperature for about 2 hours. It is then cooled to 0–5° and neutralized by the addition of 1.9 parts of acetic acid dissolved in 10 parts of water. Extraction of that mixture with chloroform affords an organic solution, which is washed successively with water and saturated aqueous sodium bicarbonate, dried over anhydrous sodium sulfate and distilled to dryness under reduced pressure to afford 17α-acetoxy-3-hydroxy-11β-methyl-19-norpregn-4-en-20-one.

A mixture of 0.5 part of 17α-acetoxy-3-hydroxy-11β-methyl-19-norpregn-4-ene-20-one, 3.9 parts of pyridine and 3.2 parts of acetic anhydride is allowed to stand at room temperature for about 6 hours, then is poured carefully into a mixture of ice and water. The precipitate which forms is collected by filtration and dissolved in chloroform. The chloroform solution is washed successively with water and aqueous sodium bicarbonate, dried over anhydrous sodium sulfate and distilled to dryness under reduced pressure to afford 3,17α-diacetoxy-11β-methyl-19-norpregn-4-en-20-one. Recrystallization of that material from acetone results in 3β,17α-diacetoxy-11β-methyl-19-norpregn-4-en-20-one, which compound displays a melting point at about 218–220° and nuclear magnetic resonance peaks at about 44, 58, 66, 122, 126, 317 and 323 cycles per second. It is represented by the following structural formula:

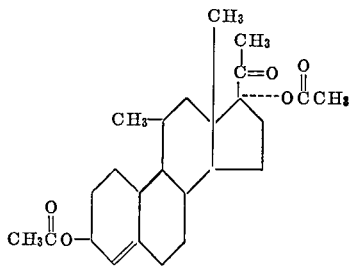

EXAMPLE 21

The reduction of 17α-n-butyryloxy-11β-methyl-19-norpregn-4-ene-3,20-dione according to the procedure of Example 20 results in 17α-n-butyryloxy-3-hydroxy-11β-methyl-19-norpregn-4-en-20-one.

The substitution of equivalent quantities of 17α-n-butyryloxy - 3 - hydroxy - 11β - methyl - 19 - norpregn - 4-en-20-one and n-butyric anhydride in the acylation procedure of Example 20 affords 3β,17α-di-n-butyryloxy-11β-methyl-9-norpregn-4-ene-20-one.

What is claimed is:

1. A compound of the formula

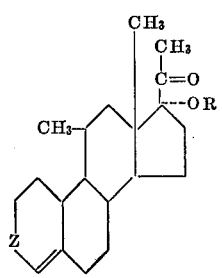

wherein R is selected from the group consisting of hydrogen and a lower alkanoyl radical and Z is a member of the class consisting of carbonyl, hydroxymethylene and (lower alkanoyl)oxymethylene radicals.

2. As in claim 1, a compound of the formula

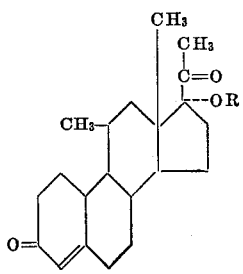

wherein R is a member of the class consisting of hydrogen and a lower alkanoyl radical.

3. As in claim 1, a compound of the formula

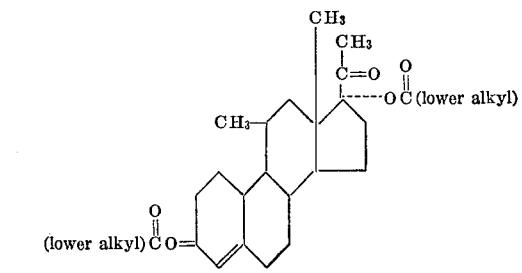

4. As in claim 1, a compound which is 17α-hydroxy-11β-methyl-19-norpregn-4-ene-3,20-dione.

5. As in claim 1, the compound which is 17α-acetoxy-11β-methyl-19-norpregn-4-ene-3,20-dione.

6. As in claim 1, the compound which is 3β,17α-diacetoxy-11β-methyl-19-norpregn-4-en-20-one.

7. As in claim 1, the compound which is 17α-acetoxy-3-hydroxy-11β-methyl-19-norpregn-4-en-20-one.

References Cited

Dorfman et al.: Steroids 1, pp. 185–209 (1963).

HENRY A. FRENCH, Primary Examiner

U.S. Cl. X.R.

260—239.5, 239.55, 397.3, 397.4, 397.5, 999